（12) United States Patent
He et al.

(10) Patent No.: US 11,070,790 B1
(45) Date of Patent: Jul. 20, 2021

(54) PASSIVE THREE-DIMENSIONAL IMAGE SENSING BASED ON SPATIAL FILTERING

(71) Applicant: Shenzhen Goodix Technology Co., Ltd., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/739,149

(22) Filed: Jan. 10, 2020

(51) Int. Cl.
*H04N 13/122* (2018.01)
*H04N 13/261* (2018.01)
*H04N 13/327* (2018.01)
*H04N 13/00* (2018.01)

(52) U.S. Cl.
CPC ......... *H04N 13/261* (2018.05); *H04N 13/122* (2018.05); *H04N 13/327* (2018.05); *H04N 2013/0081* (2013.01)

(58) Field of Classification Search
None
See application file for complete search history.

(56) References Cited

U.S. PATENT DOCUMENTS

2010/0182671 A1    7/2010  Park

2013/0222577 A1*   8/2013  Yamanaka ............... G01C 3/06
                                                         348/135
2015/0049210 A1    2/2015  Rachlin et al.
2017/0118389 A1*   4/2017  Wang ................. H04N 5/23212

FOREIGN PATENT DOCUMENTS

CN    105723239 A    6/2016
CN    109716176 A    5/2019

OTHER PUBLICATIONS

International search report dated Mar. 12, 2021(corresponding to PCT/CN2020/135651).

* cited by examiner

*Primary Examiner* — Christopher G Findley
(74) *Attorney, Agent, or Firm* — Kilpatrick Townsend & Stockton LLP

(57) ABSTRACT

Techniques are described for three-dimensional (3D) image sensing based on passive optical techniques and dynamic calibration. For example, light reflected from one or more objects in a scene is received via a lens of a novel 3D imaging system to forms an image of the object(s) on an image sensor through a spatial filter. A distribution of mask elements are associated with corresponding signal pixel sets of the image sensor, and reference elements of the spatial filter are associated with corresponding reference pixel sets of the image sensor; such that portions of the image tend to be shadowed by the mask elements at the signal pixel sets, but not at the reference pixel sets. Object distances for the one or more objects in the scene can be computed as a function of signal brightness detected by the signal pixel sets and reference brightness detected by the reference pixel sets.

18 Claims, 8 Drawing Sheets

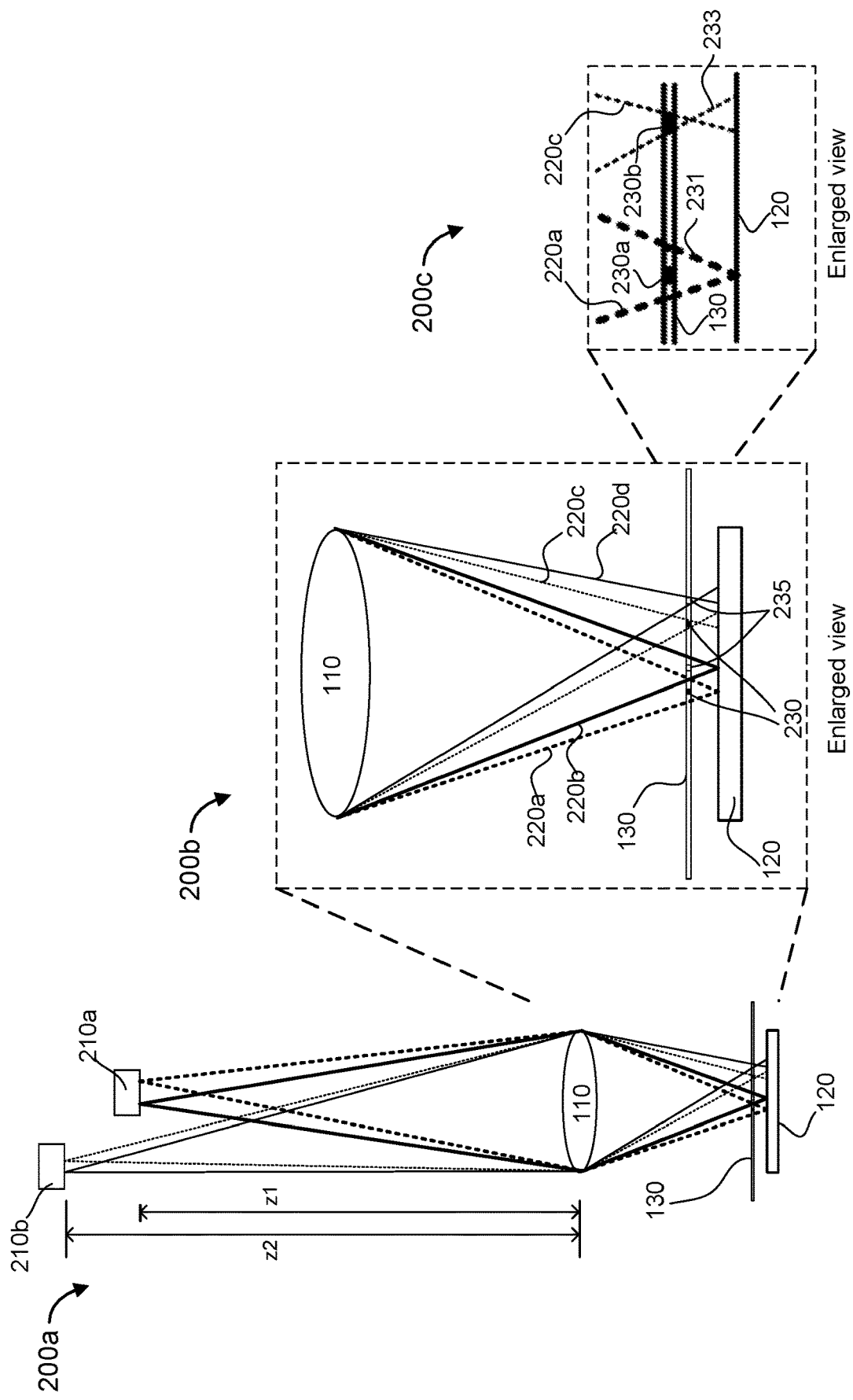

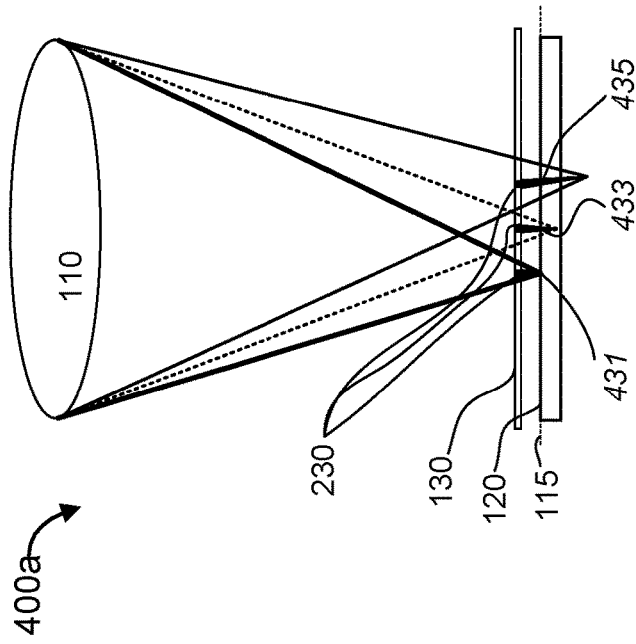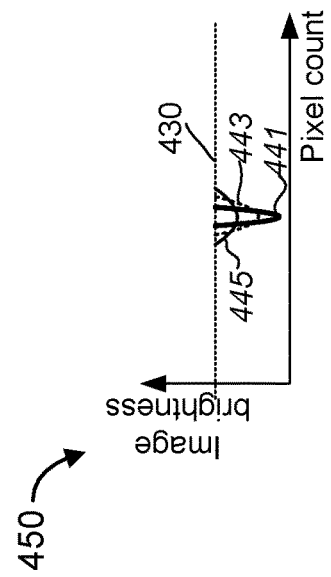
FIG. 4A FIG. 4B
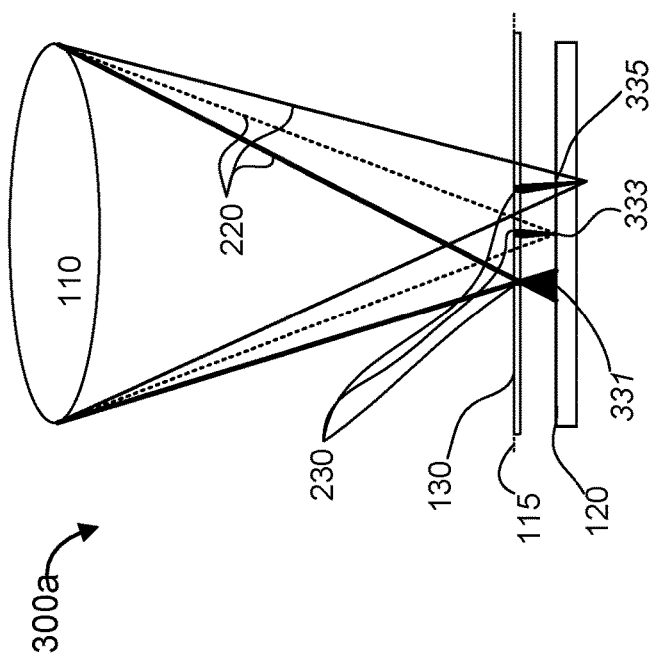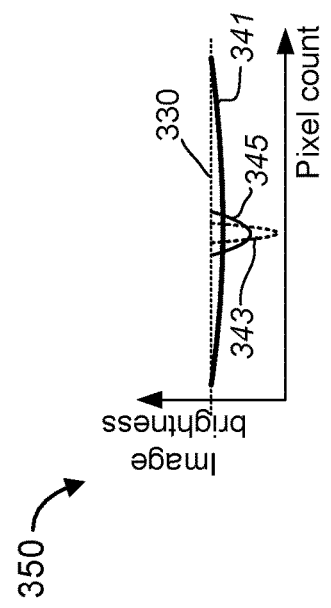
FIG. 3A FIG. 3B

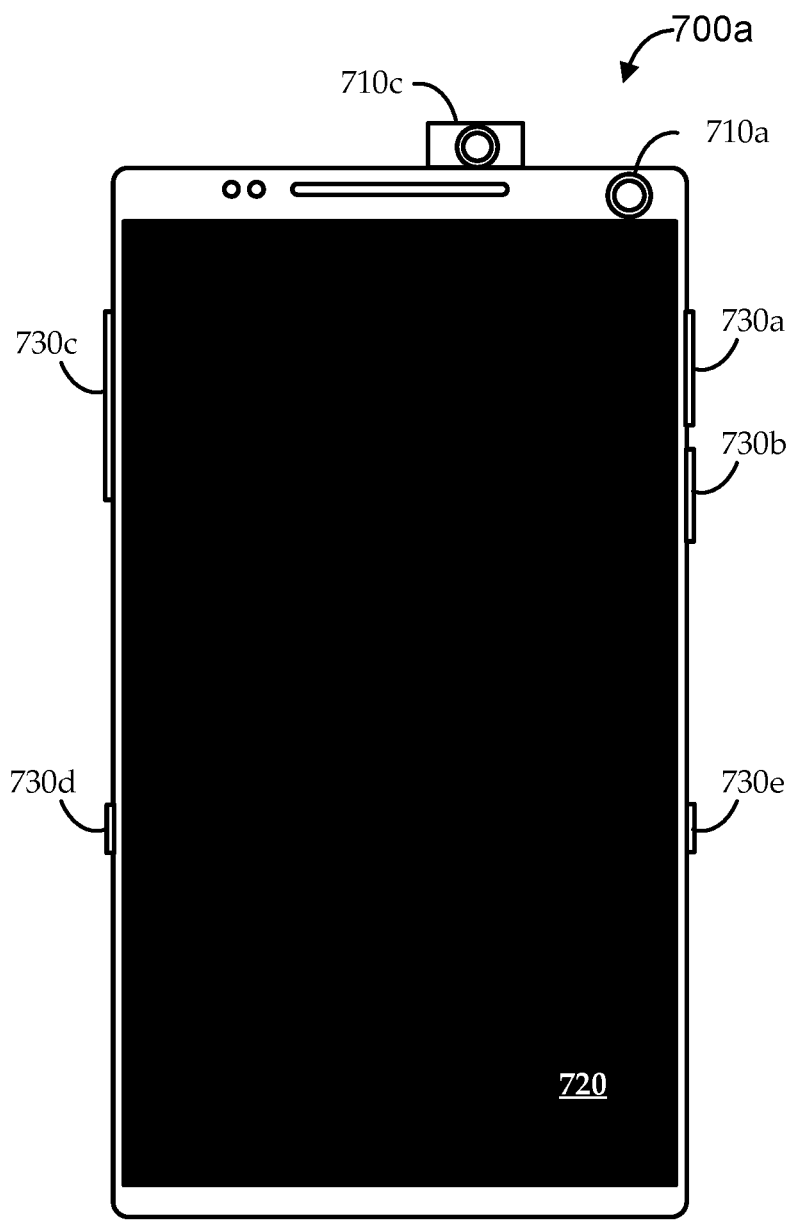
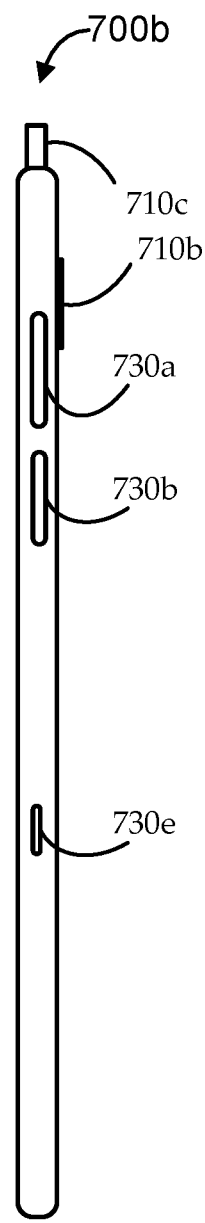
FIG. 7A  FIG. 7B

PASSIVE THREE-DIMENSIONAL IMAGE SENSING BASED ON SPATIAL FILTERING

FIELD

The invention relates generally to optics integrated into personal electronic devices. More particularly, embodiments relate to passive three-dimensional image sensing based on spatial filtering, such as for depth mapping of a three-dimensional image space to support features of a smart phone camera system.

BACKGROUND

In the past, photography was a discipline reserved to those with specialized knowledge and equipment. Over the past decades, innovations in digital photographic hardware and software, and the worldwide spread of smartphones with integrated digital cameras, have placed digital photography at the fingertips of billions of consumers. In this environment of ubiquitous access to digital photography and videography, consumers increasingly desire to be able to quickly and easily capture smart moments using their smartphones. Advances in digital photography have included advances in capturing of three-dimensional information for various purposes. For example, capturing of depth and other three-dimensional information can support three-dimensional photography and videography, as well as advanced automation in focus, stabilization, aberration correction, and other features.

Depth information is typically captured using active techniques, such as time-of-fly techniques, or triangulation techniques. For example, focused light pulses can be transmitted, and their reflections can be subsequently received; and knowledge of various parameters (e.g., the speed of light) can be used to convert pulse receipt timing into a depth measurement. Conventionally, it has been difficult to integrate such time-of-fly and other techniques in portable digital electronics applications, such as smart phones. For example, some conventional approaches rely on relatively large optics and/or specialized illumination sources that do not fit within spatial limitations of many portable digital electronic applications; while other conventional approaches tend not to be reliable or accurate enough to support more advanced features.

BRIEF SUMMARY OF THE INVENTION

Embodiments provide passive three-dimensional (3D) image sensing based on spatial filtering, such as for depth mapping of a 3D image space to support features of a smart phone camera system. For example, light reflected from one or more objects in a scene is received via a lens of a novel 3D imaging system. The lens forms an image of the object(s) on an image sensor through a spatial filter. A distribution of mask elements are associated with corresponding signal pixel sets of the image sensor, and reference elements of the spatial filter are associated with corresponding reference pixel sets of the image sensor; such that portions of the image formed at the signal pixel sets tend to be at least partially shadowed by the mask elements, and portions of the image formed at the reference pixel sets tend not to be shadowed by the mask elements. Object distances for the one or more objects in the scene can be computed as a function of signal brightness detected by the signal pixel sets and reference brightness detected by the reference pixel sets.

BRIEF DESCRIPTION OF THE DRAWINGS

The accompanying drawings, referred to herein and constituting a part hereof, illustrate embodiments of the disclosure. The drawings together with the description serve to explain the principles of the invention.

FIGS. 2A-2C show different views of an optical environment having a passive 3D optical sensing system with multiple scene objects and multiple filter pairs, according to various embodiments.

FIG. 3A shows a partial optical environment having a passive 3D optical sensing system with light being received from multiple objects at multiple distances from the lens, according to various embodiments.

FIG. 3B shows a plot of image brightness versus pixel count for the illustrated configuration of FIG. 3A.

FIG. 4A shows a partial optical environment having a passive 4D optical sensing system with light being received from multiple objects at multiple distances from the lens 110, according to various embodiments.

FIG. 4B shows a plot of image brightness versus pixel count for the illustrated configuration of FIG. 4A.

FIGS. 7A and 7B show front and side views, respectively, of an illustrative portable personal electronic device, according to various embodiments.

Figure 1:
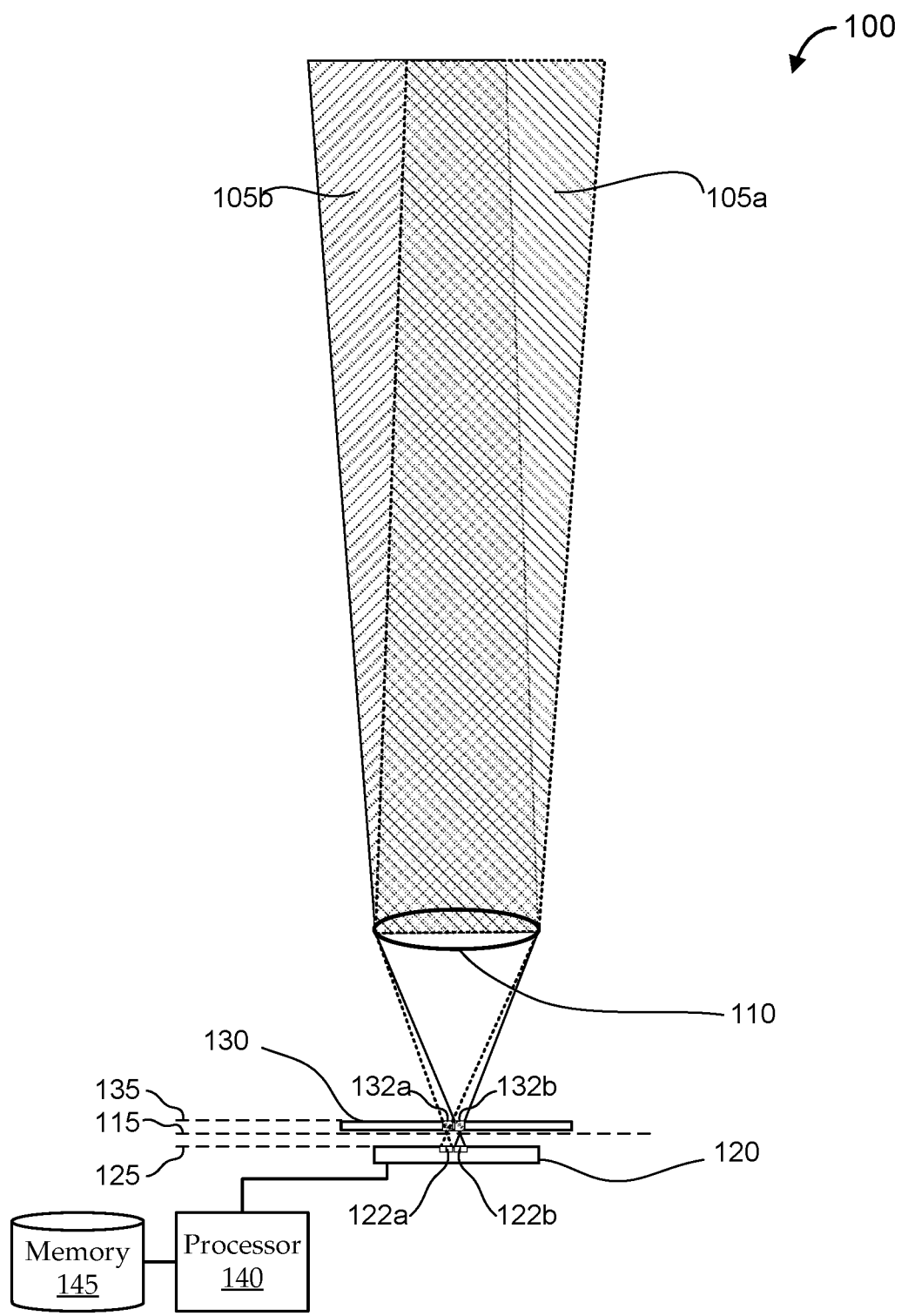
FIG. 1 shows a passive 3D image sensing environment, according to various embodiments.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Increasingly, digital imaging is exploiting depth information to support various features. For example, in three-dimensional (3D) computer graphics, depth maps are used to indicates information relating to the distance of the surfaces of scene objects from a viewpoint. Similarly, in digital photography, depth mapping, and the like, can be used to support 3D image capture features, enhanced auto-focusing features, and other features. Such digital 3D imaging is also being used to support platforms, such as 3D cameras, 3D robot vision, 3D vehicle mapping, etc. Conventionally, active techniques are used for acquiring such depth information. For example, so-called "time-of-fly" (TOF) techniques generally measure a distance of an object with respect to a reference point by emitting light beams towards an object, and measuring timing of reflections of the emitted light. With such techniques, distance can be computed by comparing the speed of light to the time it takes for the emitted light to be reflected back to the system. As another example, multiple structured light can be used to determine distance by transmitting multiple light beams in a manner that they converge and diverge at different distances. With such techniques, distance can be measured by separately imaging an object with each light beam, and comparing the images to determine a level of overlap, which can be correlated to distance. Such a technique is described in U.S. Pat. No. 10,489,925, titled "3D Sensing Technology Based on Multiple Structured Illumination."

Such conventional active techniques for 3D image sensing can be limited in various ways. One limitation is that the active illumination used by such conventional techniques can consume power and space, which may be limited in many applications, such as in smart phones and other portable electronic devices. Another limitation is that it can be difficult to dynamically calibrate such techniques to differences in ambient lighting, differences in how a detected object respond to illumination (e.g., based on the object's color, shape, reflectivity, etc.), and/or other differences between detection environments.

Embodiments described herein provide novel techniques for 3D image sensing based on passive optical techniques and dynamic calibration. For example, light reflected from one or more objects in a scene is received via a lens of a novel 3D imaging system. The lens forms an image of the object(s) on an image sensor through a spatial filter. A distribution of mask elements are associated with corresponding signal pixel sets of the image sensor, and reference elements of the spatial filter are associated with corresponding reference pixel sets of the image sensor; such that portions of the image formed at the signal pixel sets tend to be at least partially shadowed by the mask elements, and portions of the image formed at the reference pixel sets tend not to be shadowed by the mask elements. Object distances for the one or more objects in the scene can be computed as a function of signal brightness detected by the signal pixel sets and reference brightness detected by the reference pixel sets.

Turning first to FIG. 1, a passive 3D image sensing environment 100 is shown, according to various embodiments. The environment 100 includes a lens 110, an image sensor 120, a spatial filter 130, and a processor 140. The spatial filter 130 includes one or more filter pairs. The one or more filter pairs can lie substantially in a filter plane 135. The filter pairs can be arranged in any suitable manner. In some implementations, the one or more filter pairs are spatially distributed (e.g., as an array, or otherwise) over a substrate. In one implementation, the spatial distribution is uniform across the substrate. In another implementation, the spatial distribution is non-uniform across the substrate. In some implementations, multiple filter pairs are arranged in a one-dimensional pattern, such as along a line. In other implementations, multiple filter pairs are arranged in a two-dimensional pattern, such as in an array, in a circle, etc. In other implementations, multiple filter pairs are arranged in a three-dimensional pattern, such as by being embedded in the substrate of the spatial filter 130 at different vertical levels.

Each filter pair includes a mask element paired with a reference element. The mask element can be, or can include, any suitable element for modulating light interacting with the filter plane 135 in the location of the mask element. In some implementations, the mask element is an opaque mark that obstructs light from passing through the filter plane 135 at the location of the mark. In other implementations, the mask element is a color filter that modulates the color of light from passing through the filter plane 135 at the location of the mark (e.g., by only allowing transmission of certain wavelengths of light). In other implementations, the mask element is a polarization filter that modulates the polarization of light passing through the filter plane 135 at the location of the mark (e.g., by only allowing transmission of certain polarizations of light). In some implementations, the mask element is approximately the same size as a single photodetector element of the image sensor 120. In other implementations, the mask element is approximately the same size as a small group of (e.g., five) photodetector elements of the image sensor 120. In some implementations, the mask element is integrated with the spatial filter 130 substrate by being applied to a surface of the substrate. For example, the mask element can be applied as surface treatment (e.g., using paint, chemical deposition, etc.). In other implementations, the mask element is integrated with the spatial filter 130 by being formed within the substrate. In embodiments having multiple filter pairs, the mask elements can be implemented identically or differently across the filter pairs.

The reference elements can be implemented in any suitable manner to have a detectably different and deterministic impact on light interacting with the filter plane 135 in the location of the reference element. In some implementations, the substrate of the spatial filter 130 is made of a material having desired properties for the reference elements (e.g., a transparent substrate material, such as glass), and the reference element refers to a particular region of the substrate (i.e., without additional material treatment, material application, etc.). In other implementations, the reference element is configured to impact transmission of light through the spatial filter 130 in a manner that contrasts with the impact of a corresponding mask element. For example, the mask element blocks transmission of a particular wavelength of light, and the reference element permits transmission of at least the particular wavelength of light; or the mask element blocks transmission of a particular polarization of light, and the reference element permits transmission of at least the particular polarization of light.

The image sensor 120 includes a large number of photodetector elements (e.g., pixels) arranged in any suitable manner. The photodetector elements can lie in a detection plane 125 that is substantially parallel to the filter plane 135. In some implementations, the photodetector elements are arranged in an array. Certain portions of the photodetector elements (e.g., groups of one or more pixels) can be designated as one or more signal pixel sets, and other portions of the photodetector elements (e.g., groups of one or more other pixels) can be designated as one or more reference pixel sets. Each signal pixel set spatially corresponds to a mask element of a filter pair of the spatial filter 130, so that light passing through the spatial filter 130 in the area of the each mask element focuses onto a corresponding signal pixel set of the image sensor 120. Each reference pixel set spatially corresponds to a reference element of a filter pair of the spatial filter 130, so that light passing through the spatial filter 130 in the area of the each reference element focuses onto a corresponding reference pixel set of the image sensor 120.

The lens 110 can be implemented as any suitable optical arrangement for focusing light in the manner described herein. In some implementations, the lens 110 is a simple convex lens. In other implementations, the lens 110 includes multiple lenses and/or other optical structures. The lens 110 has a focal plane 115, for example, defined by its geometry. In the illustrated arrangement, the focal plane 115 is between the filter plane 135 of the spatial filter 130 and the detection plane 125 of the image sensor 120. For the sake of illustration, a first light beam 105*a* is shown as focused through the lens 110 onto a first pixel region 122*a* of the image sensor 120 through a first filter region 132*a* of the spatial filter 130, and a second light beam 105*b* is focused through the lens 110 onto a second pixel region 122*b* the image sensor 120 through a second filter region 132*b* of the spatial filter 130.

As described herein, the first filter region 132*a* may include a mask element, the first pixel region 122*a* may represent a signal pixel set of the photodetector elements, the second filter region 132*b* may include a reference element, and the second pixel region 122*b* may represent a reference pixel set of the photodetector elements. For example, when an object is in the field of view of the lens 110, the lens can form an image of the object on the image sensor 120 through the spatial filter 130. Portions of the image formed at signal pixel sets (e.g., pixel region 122*a*) tend to be at least partially modulated (shadowed) by mask elements (e.g., filter region 132*a*), while portions of the image formed at reference pixel sets (e.g., pixel region 122*b*) tend to pass through reference elements (e.g., filter region 132*b*) and tend not to be shadowed by mask elements. If the light beams 105 are sufficiently adjacent, it can be assumed the light beams 105 are originating generally from a same portion (e.g., surface) of a same object. Thus, the light beams 105 can be assumed to be arriving from substantially the same distance away from the lens 110, such that the modulated and unmodulated portions of the image can be deterministically compared.

The processor 140 can perform such a comparison, and can thereby determine a distance from which the light originated, which may correspond to an object distance for an object in the field of view of the lens 110. The processor 140 may include a central processing unit CPU, an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set (RISC) processor, a complex instruction set processor (CISC), a microprocessor, or the like, or any combination thereof. Embodiments of the processor 140 are configured to determine a signal brightness according to an optical response by one or more signal pixel sets to the light, and to determine a reference brightness according to an optical response by one or more reference pixel set to the light. For example, the signal brightness is a value or set of values indicating a brightness of the light as modulated by one or more corresponding mask elements, and the reference brightness is a value or set of values indicating a brightness of the light as unmodulated by the one or more corresponding mask elements (and/or as differently modulated by one or more corresponding reference elements). In some embodiments, the processor 140 determines a signal brightness map from multiple values of respective signal brightness from across multiple of the signal pixel sets, determines a reference brightness map from multiple values of reference brightness determined from across multiple of the respective reference pixel sets. The processor 140 can then compute a depth map for the scene as a function of the signal brightness map and the reference brightness map.

The processor 140 can compute an object distance for one or more scene objects (e.g., in the field of view of the lens 110) as a function of the signal brightness and the reference brightness. In some embodiments, the processor 140 computes one or more ratios of one or more signal brightness measurements to one or more reference brightness measurements, and computes one or more object distances in accordance with a predefined functional relationship (e.g., a hard-coded mathematical formula) between such a ratio and object distance. In other embodiments, the processor 140 is in communication with a non-transient memory 145. The non-transient memory 145 can include any suitable type of memory for storing a lookup table. As used herein, a lookup table generally refers to any associative data structure in which each of a first set of values can be associated with a respective one of a second set of values. The lookup table can have, stored thereon, multiple calibration mappings, each associating a particular stored object distance with a corresponding stored ratio between signal brightness and reference brightness. For example, after determining (detecting) signal brightness and reference brightness for a particular filter pair, the processor 140 can compute the ratio, identify one of the stored ratios in the lookup table that most closely matches the computed ratio, and determine the object distance as the stored object distance stored in the lookup table in association with the identified one of the stored ratios.

As described herein, the lookup table can be generated as part of a calibration procedure. For example, during the calibration procedure, one or more calibration targets can be placed at multiple calibration distances. For each calibration distance (e.g., and target type), a respective ratio can be computed from signal and reference brightness values determined for that calibration distance. Each of some or all of the resulting ratio computations can be stored as a calibration mapping by associating the computed value for the ratio with a known value for the calibration distance, and storing the association in the lookup table. In some embodiments, some or all of the computed ratios can be used to fit a formulaic expression to the data. For example, the relationship between ratio values and object distances can tend to fit polynomials of a particular order, and the computed ratio values can be used to further compute coefficients for the polynomial as part of the calibration procedure. The calibration formula can subsequently be used for determining object distances as a function of ratio computations.

Various embodiments are sized to fit particular applications. Some embodiments are implemented in context of a smart phone or other small portable electronic device. In such embodiments, the lens 110 may have a small diameter, a small focal length, and a relatively small dynamic range. In some embodiments, the image sensor 120 has a particular pixel size (P), and the spatial filter 130 is positioned so that the filter plane 135 and the detection plane 125 are separated by a small multiple of P (e.g., 2P). For example, the lens 110 has a diameter on the order of five millimeters, the image sensor 120 has a pixel size on the order of five microns, and the filter plane 135 is located on the order of 10 microns away from the detection plane 125.

For the sake of added clarity, FIGS. 2A-5B describe certain principles and features of various embodiments. FIGS. 2A-2C show different views of an optical environment 200 having a passive 3D optical sensing system with multiple scene objects 210 and multiple filter pairs, according to various embodiments. As described with reference to FIG. 1, the passive 3D optical sensing system includes a lens 110, an image sensor 120, and a spatial filter 130. Other components (e.g., the processor 140 and memory 145) are not shown to avoid over-complicating the figure. FIG. 2A shows a zoomed-out view, illustrating two scene objects 210 at different object distances (labeled "z1" and "z2") from the lens 110. Though the distances are described with reference to the lens 110, embodiments can be implemented to describe any suitable distances, such as between objects and the imaging plane of the image sensor 120. For the sake of illustration, light is shown as originating from two adjacent locations on each scene object 210. For example, ambient light (or probe light, or other illumination) reflects (e.g., scatters by specular reflection) off of the scene objects 210, and some of the light travels in the direction of the lens 110. As the light travels, it tends to diverge until reaching the lens 110, and the lens 110 causes the light to re-converge in accordance with the focal length and/or other properties of the lens 110.

FIG. 2B shows an enlarged view of a region of the passive 3D optical sensing system between the lens 110 and the image sensor 120. In this region, the various beams of light are focused by the lens 110, such that each is shown as a convergence cone 220. In the illustrated arrangement, the focal plane of the lens 110 is substantially at the filter plane of the spatial filter 130, such that light originating from infinitely far away would tend to be focused by the lens substantially at the filter plane. Scene object 210a is at a distance that happens to be in focus with reference to the image sensor 120, as light originating from the illustrated distance "z1" is shown to be focused by the lens 110 substantially at the detection plane of the image sensor 120 (i.e., the corresponding convergence cones 220a and 220b are shown coming to a point substantially at the detection plane). Scene object 210b is at a distance of "z2," which is farther away from the lens 110 than scene object 210a, such that its corresponding convergence cones 220c and 220d are shown coming to a point closer to the filter plane (well above the detection plane). Each convergence cone 220 is illustrated as passing through a respective location of the spatial filter 130 at which there is either a mask element 230 or a reference element 235. As illustrated, the lens 110 effectively forms an image of each scene object 210 onto the image sensor 120 through the spatial filter 130. For each scene object 210, a portion of its image is formed from light passing through (and affected by) at least one mask element 230, and another portion of its image is formed from light passing through at least one reference element 235 (and not affected by the at least one mask element 230).

As illustrated by FIG. 2C, the extent to which a mask element 230 impacts the light of a particular convergence cone 220 depends on where the convergence cone 220 comes to a point, which corresponds to the object distance of the scene object 210. The closer scene object 210a produces convergence cone 220a, and the further scene object 210b produces convergence cone 220c. As shown, a relatively small portion of convergence cone 220a interacts with mask element 230a, such that mask element 230a produces a relatively small shadow in the image formed at the image sensor 120. In contrast, a relatively large portion of convergence cone 220c interacts with mask element 230b, such that mask element 230b produces a relatively large shadow in the image formed at the image sensor 120 (i.e., substantially all of the light of convergence cone 220c is modulated, blocked, or otherwise affected by mask element 230b).

For any particular scene object 210, the brightness of the scene object 210 can be described as Ao(x, y, z), the transmission of the signal light (e.g., along convergence cone 220a or 220c) can be described as a signal filter function Ts(x, y, z), and the transmission of the reference light (e.g., along convergence cone 220b or 220d) can be described as a reference filter function Tr(x, y, z). The image brightness of the signal light can be described as Is(x, y, z)≈Ao(x, y, z)*Ts(x, y, z). The image brightness of the reference light can be described as Ir(x, y, z)≈Ao(x, y, z)*Tr(x, y, z). A sensing function can accordingly be described by the following ratio:

$$F(x,y,z)=[Ao(x,y,z)*Ts(x,y,z)]/[Ao(x,y,z)*Tr(x,y,z)]=Ts(x,y,z)/Tr(x,y,z)$$

In principle, the object brightness does not affect the distance sensing. In practice, the object brightness can affect signal to noise ratio (SNR) of the detection. It can be seen that, assuming an opaque mask element 230, imaging of a scene object 210 that is infinitely far away in principle results in a minimum image brightness for the signal light (e.g., the signal light is detected as fully dark), F(x, y, z) is minimum, while imaging of a scene object 210 with a distance corresponding to the lens 110 aperture in principle results in a maximum image brightness for the signal light (e.g., the signal light is detected as fully bright).

FIG. 3A shows a partial optical environment 300 having a passive 3D optical sensing system with light being received from multiple objects at multiple distances from the lens 110, according to various embodiments. As described with reference to FIG. 1, the passive 3D optical sensing system includes a lens 110, an image sensor 120, and a spatial filter 130. Only a portion of the components are shown to avoid over-complicating the figure. As illustrated, three beams of light originating from three different distances (e.g., by specular reflection off of one or more scene objects) are focused by the lens 110 along respective convergence cones 220. Each convergence cone 220 is shown passing through the spatial filter 130 at a respective mask element 230 before reaching the image sensor 120. While the convergence cones 220 are shown as interacting with different locations of the spatial filter 130 and the image sensor 120 (e.g., with different respective mask elements 230, this is only for clarity of illustration. In operation, light from a single object distance may pass through a particular one or more mask elements 230 during one detection session, and light from a different object distance may pass through the same particular one or more mask elements 230 during a different detection session at a different time.

The focal plane 115 of the lens 110 is substantially at the filter plane of the spatial filter 130. As such, light from a farthest away object is focused by the lens 110 at around the filter plane 135 (at the focal plane 115), and its interaction with the mask element 230 results in a relatively large impact cone 331. In contrast, light from a nearby object is focused by the lens 110 well past the filter plane 135, such that its interaction with any particular mask element 230 tends to result in a relatively small impact cone (e.g., impact cone 333 or 335). However, a comparison of impact cone 333 and impact cone 335 illustrates a potential limitation of this configuration.

FIG. 3B shows a plot 350 of image brightness versus pixel count for the illustrated configuration of FIG. 3A. The plot 350 includes a reference brightness level 330, which is shown as consistent across the various object distances for the sake of comparison. The plot 350 also shows a first illustrative brightness curve 341 as detected by a set of pixels responsive to the first impact cone 331, a second illustrative brightness curve 343 as detected by a set of pixels responsive to the second impact cone 333, and a third illustrative brightness curve 345 as detected by a set of pixels responsive to the third impact cone 335. Brightness curve 341 is responsive to light originating from a furthest object distance, brightness curve 345 is responsive to light originating from a closest object distance, and brightness curve 343 is responsive to light originating from an in-between object distance that is between the closest and furthest object distances. Because the different distances result in different impact cones, the resulting brightness curves can be used to determine object distance.

However, because the in-between distance corresponds to an object that is "clearly seen" by the image sensor 120 (its convergence cone 220 converges at the detection plane of the image sensor 120), the in-between distance yields the lowest cross talk and tends to correspond to a minimum brightness condition. The impact cone tends to grow both with greater and lesser distances from the in-between distance, such that it may be difficult to differentiate between distances on either side of the in-between distance. For example, an object located slightly closer than the in-between distance and an object located slightly further than the in-between distance may produce similar impact cones and corresponding brightness curves.

FIG. 4A shows a partial optical environment 400 having a passive 4D optical sensing system with light being received from multiple objects at multiple distances from the lens 110, according to various embodiments. The environment 400 of FIG. 4A is similar to the environment 300 of FIG. 3A, except that the focal plane 115 of the lens 110 is located substantially at the detection plane of the image sensor 120. As such, light from a farthest away object is focused by the lens 110 at around the detection plane (at the focal plane 115) and generates an impact cone 431 that is also focused at the image sensor 120. As the origin point of the light becomes nearer to the lens 110, the light and the resulting impact cone tends to be focused to a point increasingly past the detection plane.

FIG. 4B shows a plot 450 of image brightness versus pixel count for the illustrated configuration of FIG. 4A. The plot 450 includes a reference brightness level 430, which is shown as consistent across the various object distances for the sake of comparison. The plot 450 also shows a first illustrative brightness curve 441 as detected by a set of pixels responsive to the first impact cone 431, a second illustrative brightness curve 443 as detected by a set of pixels responsive to the second impact cone 433, and a third illustrative brightness curve 445 as detected by a set of pixels responsive to the third impact cone 435. Unlike in FIG. 3B, the brightness curves in FIG. 4B are more uniquely indicative of object distance. In particular, the minimum value of the brightness curves is lowest for the furthest object distance, highest for the closest object distance, and in-between for the in-between object distance.

Figures 5A, 5B:
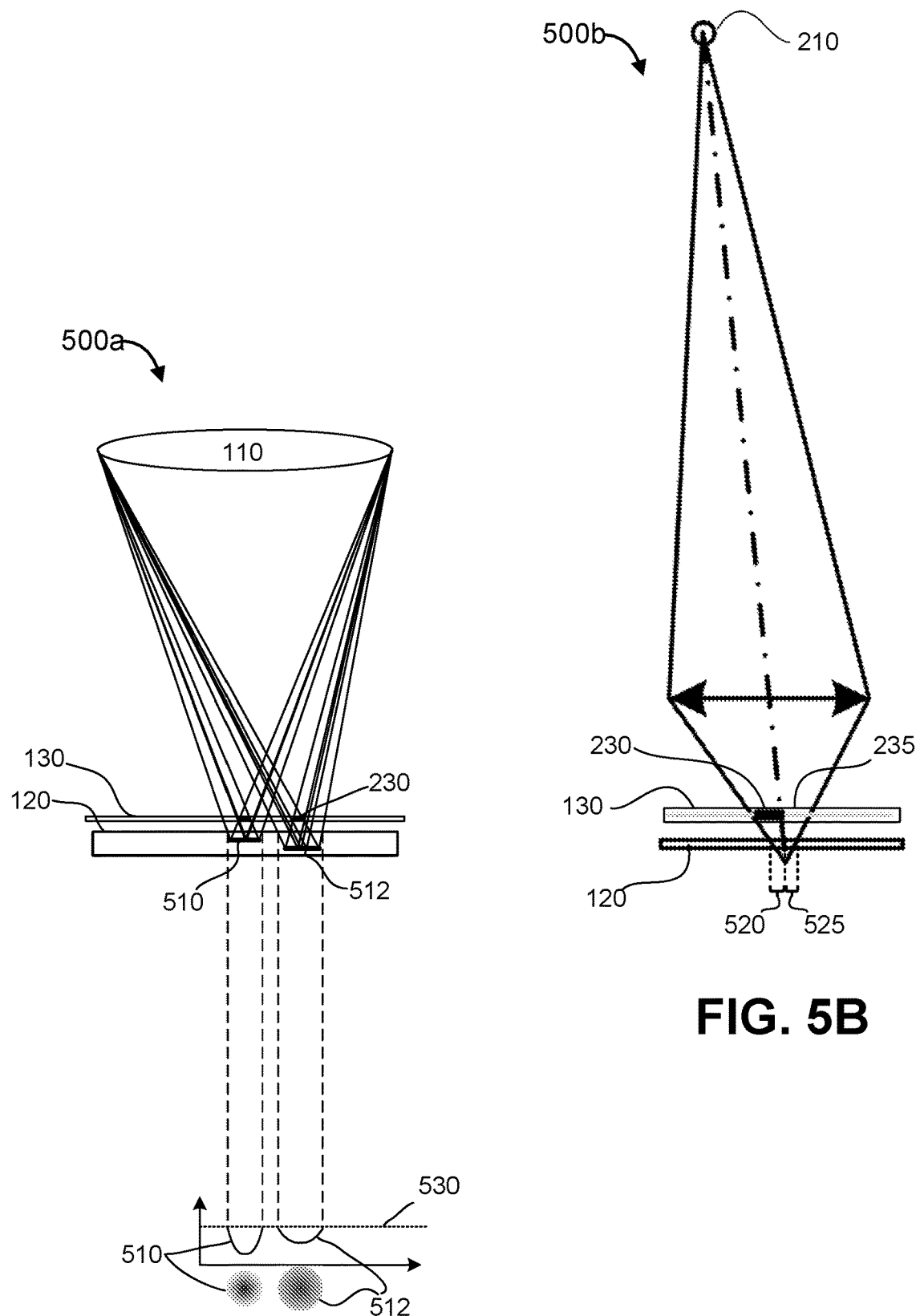
FIG. 5A shows a partial optical environment having a passive 3D optical sensing system manifesting cross-talk, according to various embodiments.
FIG. 5B shows a simplified optical environment configured to address cross-talk considerations illustrated by FIG. 5A, according to various embodiments.

FIG. 5A shows a partial optical environment 500a having a passive 3D optical sensing system manifesting cross-talk, according to various embodiments. As described with reference to FIG. 1, the passive 3D optical sensing system includes a lens 110, an image sensor 120, and a spatial filter 130. Only a portion of the components are shown to avoid over-complicating the figure. In the illustrated configuration, the spatial filter 130 is positioned slightly above the focal plane 115 of the lens 110, and the image sensor 120 is positioned close to (or on) the focal plane 115. In some cases, as shown, overlapping light paths may result in certain light in the vicinity of a mask element 230 interacting with the mask element 230, while other light in the vicinity of the mask element 230 bypasses the mask element 230, causing cross-talk. For example, when evaluating a particular light beam alone (as in the descriptions above), the light beam can be impacted in a particular way when encountering a mask element 230, and that impact can be directly detected by a corresponding signal pixel set. However, when there are overlapping light beams, beams tending to bypass the mask element 230 may reintroduce light to the otherwise shadowed signal pixel set.

The shading and bypass can manifest as cross-talk at a signal pixel set. When the image of the scene object 210 is formed closer to the detection plane of the image sensor 120, the crosstalk tends to decrease. In the illustrated configuration, in which the focal plane 115 is assumed to be substantially at the detection plane, farther objects would tend to produce less cross-talk than nearer objects. This can be seen by comparing the farther object image 510 with the nearer object image 512. For added clarity, FIG. 5A also shows the farther object image 510 and the nearer object image 512, each plotted as brightness over a set of pixels. FIG. 5A also shows the farther object image 510 and the nearer object image 512, each as indicated by an output of an illustrative signal pixel set, whereby a brightness indicated by each photodetector element in the signal pixel set is responsive to the amount of light energy reaching that photodetector element. As shown, the nearer object image 512 manifests a substantially larger amount of cross-talk.

FIG. 5B shows a simplified optical environment 500b configured to address cross-talk considerations illustrated by FIG. 5A, according to various embodiments. To optimize detection, embodiments can align the spatial filter 130 with the image sensor 120 so that the particular sets of pixels being used for detection are optimally paired with corresponding elements of filter pairs. The illustrated configuration shows a single filter pair of the spatial filter 130 as including a mask element 230 and a reference element 235. The pixels of the image sensor 120 are carefully paired so that a particular signal pixel set 520 is selected so as to receive modulated (e.g., shaded) light via a particular corresponding mask element 230 while minimizing cross-talk; and a particular reference pixel set 525 is selected so as to receive unmodulated (e.g., clear) light via a particular corresponding reference element 235 while minimizing cross-talk. In some embodiments, one or more particular filter pairs are optimized for one or more particular object types and/or distances. For example, during calibration, it can be determined (e.g., by the processor 140) that assigning particular pixels to the signal pixel set and the reference pixel set can minimize cross-talk and improve detection.

Figure 6:
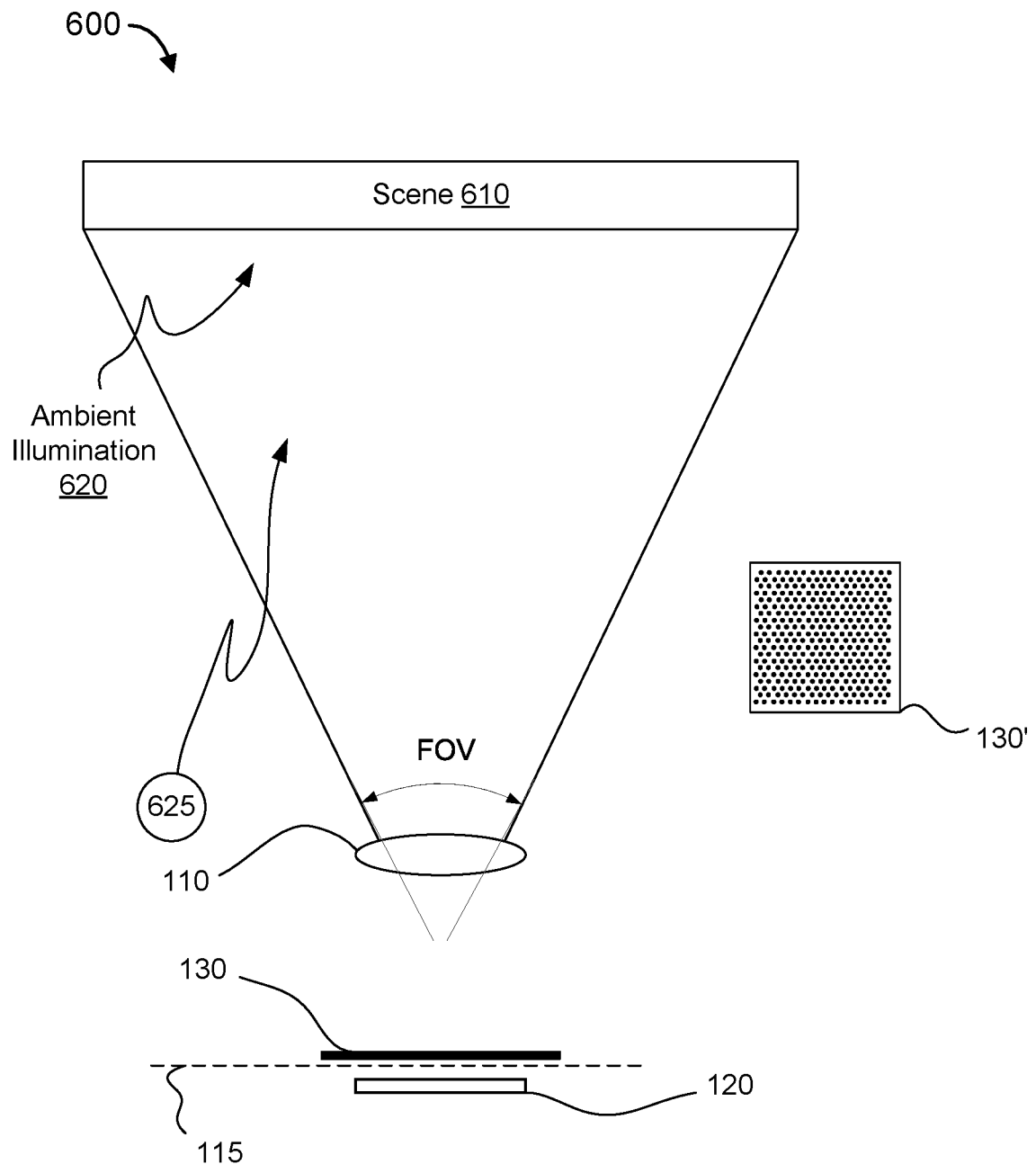
FIG. 6 shows a partial optical environment having a passive 3D optical sensing system with light being received from a scene having one or more types of illumination, according to various embodiments.

FIG. 6 shows a partial optical environment 600 having a passive 3D optical sensing system with light being received from a scene 610 having one or more types of illumination, according to various embodiments. As described with reference to FIG. 1, the passive 3D optical sensing system includes a lens 110, an image sensor 120, and a spatial filter 130. Only a portion of the components are shown to avoid over-complicating the figure. In the illustrated environment 600, the passive 3D optical sensing system can be used to image a scene 610 in a field of view (FOV) of the lens 110.

The scene 610 can include multiple scene objects, which may be discrete objects at one or more object distances away from the lens, target points (on a single object, or multiple objects) at one or more object distances away from the lens, etc. The scene 610 may be illuminated in one or more ways. In some cases, the scene 610 is in an environment with ambient illumination 620, such as incidental natural or artificial lighting. In other cases, the scene 610 has one or more illumination sources 625 (e.g., probe lighting sources) focused on one or more portions of the scene 610. In other cases, one or more scene objects may produce its own illumination.

The spatial filter 130 is shown in a location that positions the filter plane close to (or on) the focal plane 115 of the lens 110. An illustrative embodiments of the spatial filter 130 is shown as spatial filter 130', having an array of mask elements 230. As described herein, each mask element 230 can be part of a filter pair that also has a reference element 235. For example, for the illustrated spatial filter 130', the dark spots represent the mask elements 230, and certain white regions adjacent to those dark spots correspond to the reference elements 235. As described above, the spatial filter 130 can be configured do that each filter pair (e.g., each pairing of a mask element 230 with a reference element 235) is optimized for one or more particular object distances. For example, each filter pair optimally receives signal light and reference light with minimal cross-talk.

FIGS. 7A and 7B show front and side views, respectively, of an illustrative portable personal electronic device (PPED) 700, according to various embodiments. As used herein, a PPED can include a smartphone, tablet computer, laptop computer, smart wearable device (e.g., a smartwatch), or any other suitable device that has one or more integrated digital imaging systems 710. Embodiments of the PPED 700 can also include one or more displays 720. Though not explicitly shown, some embodiments of the display 720 can have, integrated therewith, capacitive touchscreen elements, another digital imaging system 710, a fingerprint sensor, and/or other components. User interface components can also include one or more physical buttons 730. For example, the physical buttons 730 can include a power button, volume buttons, etc. In some implementations, one or more of the buttons is dedicated to a particular function, and one or more of the buttons is dynamically assignable (e.g., by an application processor and/or other components) to various functions. Though not shown, the PPED 700 can include additional user interface components, such as optical sensors, force sensors, biometric sensors, accelerometers, etc.

One or more (e.g., all) of the digital imaging systems 710 can include a passive 3D optical sensing system. The passive 3D optical sensing system(s) are configured to support capturing of depth information to support three-dimensional features of camera(s) and/or other components. For example, as illustrated, the PPED 700 can include a front-facing (e.g., selfie) digital imaging system 710a, a rear-facing digital imaging system 710b (shown in FIG. 7B), a pop-out digital imaging system 710c, and/or any other suitable integrated digital imaging systems 710. For example, a user desires to capture an image using one of the digital imaging systems 710. The PPED 700 initializes various hardware and software elements to enter an image acquisition mode. As part of the mode, a passive 3D optical sensing system is used to passively collect optical information from the scene in the field of view of the camera, and to determine one or more object distances, and/or generate a depth map of some or all of the scene. As described herein, the optical information is passively received via various optics and sensors, including a lens 110, an image sensor 120, and a spatial filter 130, and can be processed by a processor 140 coupled with memory 145. In some embodiments, the processor 140 and/or the memory 145 are dedicated components of the passive 3D optical sensing system. In other embodiments, the processor 140 is implemented by a processor of the PPED (e.g., a central processor, graphics processor, or other processor of the PPED, not specific to the passive 3D optical sensing system). In other embodiments, the memory 145 is implemented by memory of the PPED, such as removable or non-removable storage of the PPED not specific to the passive 3D optical sensing system.

Figure 8:
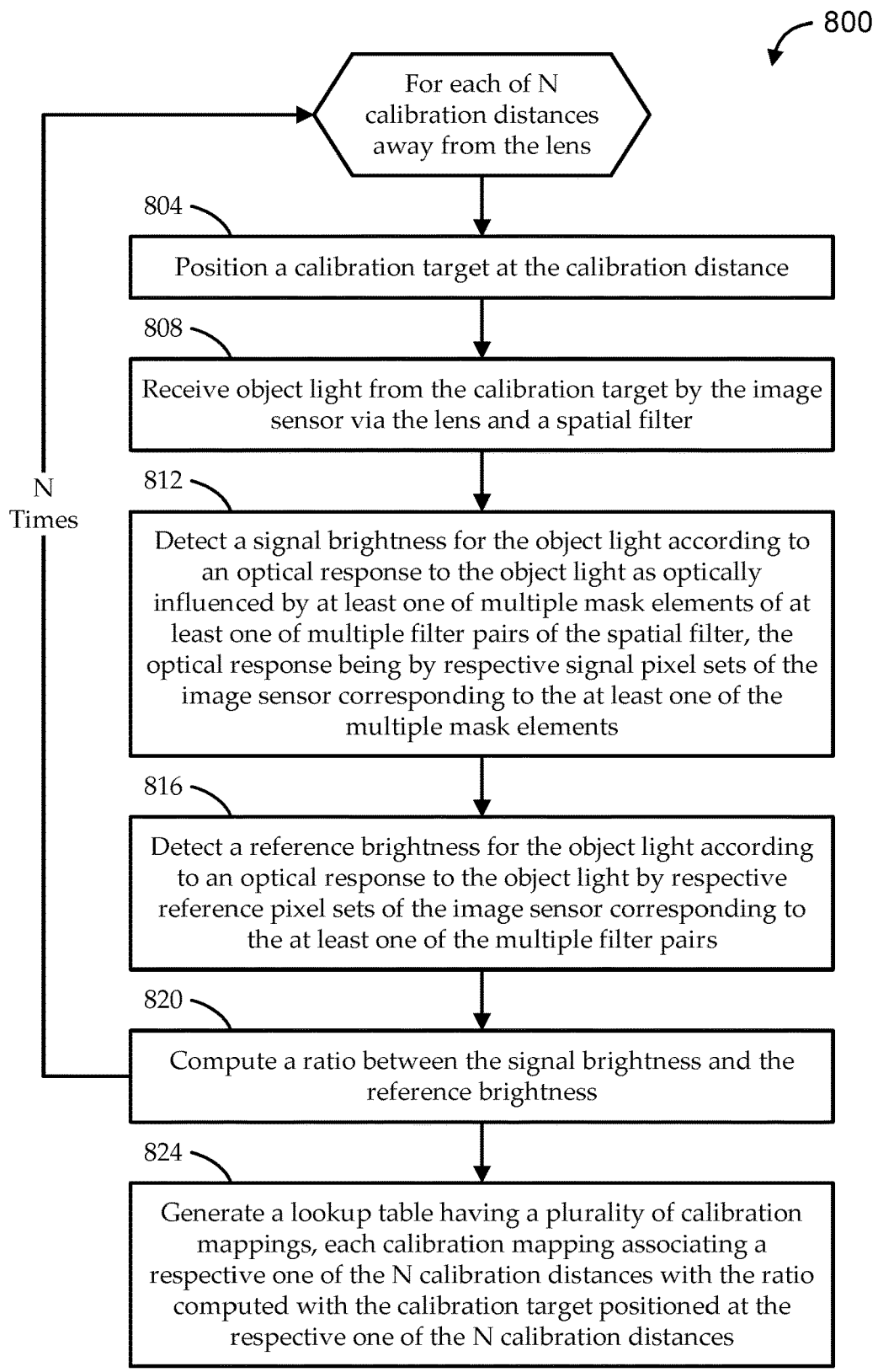
FIG. 8 shows a flow diagram of a method for calibrating a passive three-dimensional imaging system, according to various embodiments.

The various systems above can be used to perform various methods, such as those described with reference to FIGS. 8 and 9. FIG. 8 shows a flow diagram of a method 800 for calibrating a passive three-dimensional imaging system, according to various embodiments. The passive 3D optical sensing system includes a lens, an image sensor, and a spatial filter mask. The spatial filter can include multiple filter pairs, each being a respective mask element of a plurality of mask elements paired with a respective reference element of a plurality of reference elements. The image sensor can include multiple photodetector elements arranged in an array forming a detection plane substantially parallel to the filter plane. The photodetector elements can include one or more signal pixel sets, each spatially corresponding to a respective mask element of one of the multiple filter pairs; and the photodetector elements can include one or more reference pixel sets, each spatially corresponding to a respective reference element of one of the multiple filter pairs.

Embodiments of the method 800 perform calibration for each of N calibration distances, where N is a positive integer. The N iterations of the method 800 can be performed sequentially and/or concurrently. For each iteration, embodiments can begin at stage 804 by positioning a calibration target at the calibration distance for that iteration. At stage 808, embodiments can receive object light from the calibration target by the image sensor via the lens and the spatial filter mask. At stage 812, embodiments can detect a signal brightness for the object light according to an optical response to the object light as optically influenced by at least one of the mask elements of at least one of the filter pairs, the optical response being by the respective signal pixel sets corresponding to the at least one of the mask elements. At stage 816, embodiments can detect a reference brightness for the object light according to an optical response to the object light by the respective reference pixel sets corresponding to the at least one of the filter pairs. At stage 820, embodiments can compute a ratio between the signal brightness and the reference brightness.

At stage 824, embodiments can generate (e.g., in a memory) a lookup table having multiple calibration mappings. Each calibration mapping can associate a respective one of the calibration distances with the ratio computed with the calibration target positioned at the respective one of the calibration distances. In some embodiments, the generating at stage 824 is part of each iteration, such that each calibration mapping is added to the lookup table at the end of the iteration. In other embodiments, the various computations at stage 820 are stored for the various iterations, and the lookup table is generated at stage 824 after all the iterations are complete. For example, generating the lookup table can involve additional steps, such as sorting, filtering, averaging, normalizing, and/or otherwise preparing the data in a desired format for storing as part of the lookup table. Embodiments of the method 800 can include additional calibration stages.

Some such embodiments, as described herein, can determine which sets of pixels are optimally suitable to be paired as filter pairs and to be associated with particular mask elements and reference elements, for example, to minimize cross-talk.

Figure 9:
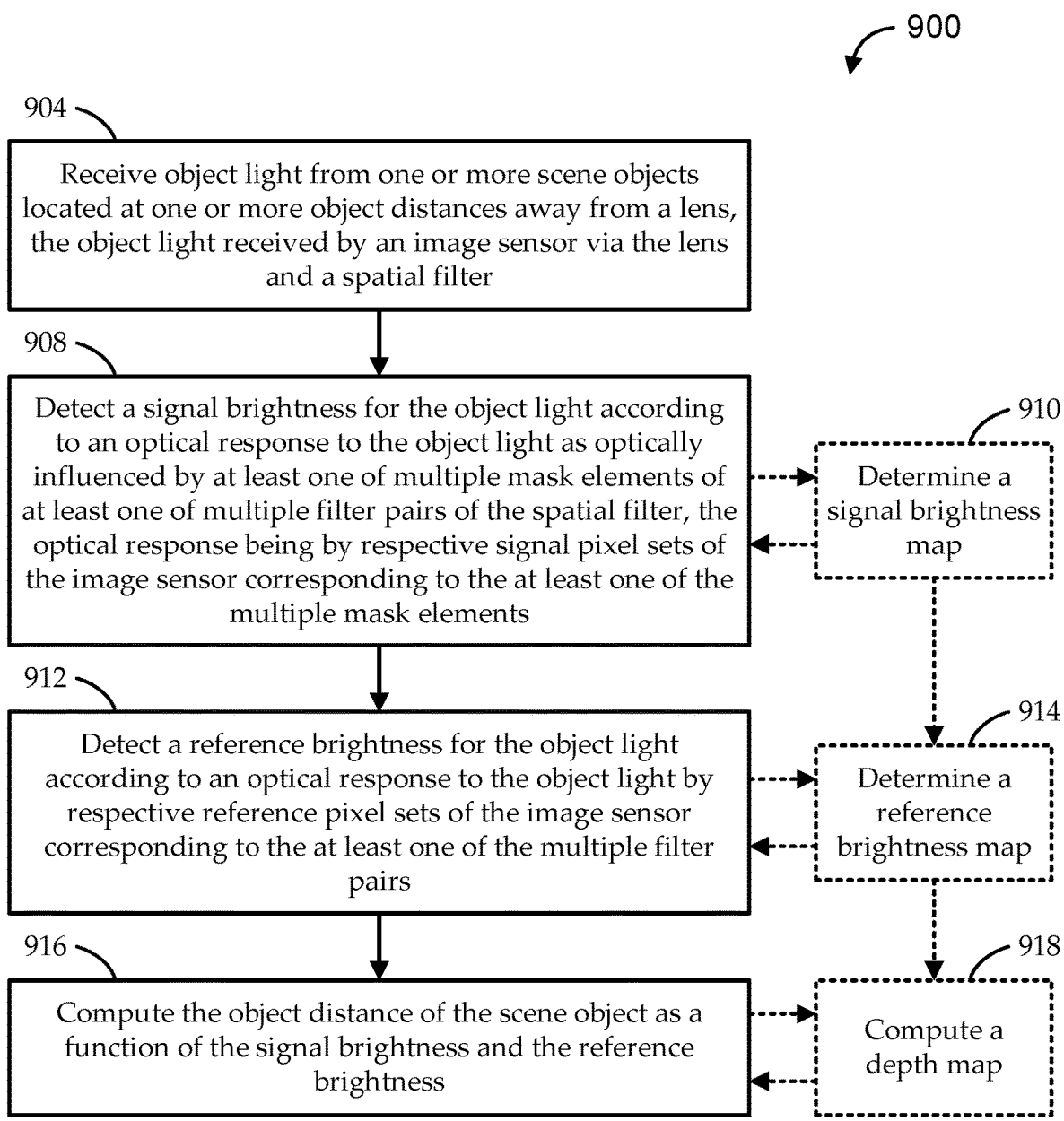
FIG. 9 shows a flow diagram of a method for passive three-dimensional imaging, according to various embodiments.

FIG. 9 shows a flow diagram of a method 900 for passive three-dimensional imaging, according to various embodiments. Embodiments of the method 900 operate in context of a passive 3D optical sensing system having a lens, an image sensor, and a spatial filter mask. The spatial filter can include multiple filter pairs, each being a respective mask element of a plurality of mask elements paired with a respective reference element of a plurality of reference elements. The image sensor can include multiple photodetector elements arranged in an array forming a detection plane substantially parallel to the filter plane. The photodetector elements can include one or more signal pixel sets, each spatially corresponding to a respective mask element of one of the multiple filter pairs; and the photodetector elements can include one or more reference pixel sets, each spatially corresponding to a respective reference element of one of the multiple filter pairs.

Embodiments of the method 900 begin at stage 904 by receiving object light from a scene object located at an object distance away from the lens. The object light is received by the image sensor via the lens and the spatial filter mask. At stage 908, embodiments can detect a signal brightness for the object light according to an optical response to the object light as optically influenced by at least one of the mask elements of at least one of the filter pairs, the optical response being by the respective signal pixel sets corresponding to the at least one of the mask elements. At stage 912, embodiments can detect a reference brightness for the object light according to an optical response to the object light by the respective reference pixel sets corresponding to the at least one of the filter pairs.

At stage 916, embodiments can compute the object distance of the scene object as a function of the signal brightness and the reference brightness. In some embodiments, the computing at stage 916 includes: computing a ratio of the signal brightness and the reference brightness; matching the ratio to a closest one of multiple pre-calibrated ratios in a lookup table of calibration mappings, each indicating a respective pre-calibrated object distance as associated during a calibration routine with a respective pre-calibrated ratio, each pre-calibrated ratio between a respective measured signal brightness and a respective measured reference brightness; and determining the object distance as the respective one of the pre-calibrated object distances associated with the closest one of the plurality of pre-calibrated ratios in the lookup table.

In some embodiments, the scene object is one of multiple scene objects of a scene in a field of view of the lens. Some such embodiments can further include determining a signal brightness map at stage 910 by performing the detecting the signal brightness across multiple of the plurality of signal pixel sets; determining a reference brightness map at stage 914 by performing the detecting the reference brightness across multiple of the plurality of reference pixel sets; and computing a depth map for the scene as a function of performing the computing for the respective object distance of the each scene object in accordance at stage 918 with the signal brightness map and the reference brightness map.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second," "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A passive three-dimensional imaging system comprising:
    a spatial filter disposed in a filter plane and comprising a filter pair having a mask element paired with a reference element;
    an image sensor comprising a plurality of photodetector elements arranged in an array forming a detection plane substantially parallel to the filter plane, the plurality of photodetector elements comprising a signal pixel set of the photodetector elements that spatially corresponds to the mask element, and a reference pixel set of the photodetector elements that spatially corresponds to the reference element;

a lens configured to form, onto the image sensor through the spatial filter, an image of a scene object located an object distance away from the lens, such that object light from the scene object is focused by the lens onto the signal pixel set and the reference element, receipt of the object light by the signal pixel set is optically influenced by the mask element, and receipt of the object light by the reference pixel set is not optically influenced by the mask element;

a non-transient memory comprising a lookup table of calibration mappings, each calibration mapping indicating one of a plurality of pre-calibrated object distances associated with a respective one of a plurality of pre-calibrated ratios, each between a respective measured signal brightness and a respective measured reference brightness; and a processor configured to determine a signal brightness according to an optical response by the signal pixel set to the object light, to determine a reference brightness according to an optical response by the reference pixel set to the object light, and to compute the object distance of the scene object as a function of the signal brightness and the reference brightness by computing a ratio of the signal brightness and the reference brightness, and obtaining the object distance as the one of the plurality of pre-calibrated object distances associated with the respective one of the plurality of pre-calibrated ratios closest to the computed ratio according to the calibration mapping.

2. The system of claim 1, wherein the spatial filter is positioned so that a focal plane of the lens lies between the filter plane and the detection plane.

3. The system of claim 1, wherein the spatial filter is positioned so that the filter plane is substantially coplanar with a focal plane of the lens.

4. The system of claim 1, wherein:
the spatial filter comprises a substrate;
the mask element is a light-inhibitive element integrated with the substrate; and
the reference element is a light-permissive element integrated with the substrate adjacent to the respective mask element.

5. The system of claim 4, wherein:
the mask element is light-inhibitive by applying a modulation to light interacting with the mask element, the modulation being of transmission of the light, of a wavelength of the light, and/or of a polarization of the light; and
the reference element is light-permissive by not applying the modulation.

6. The system of claim 4, wherein the mask element is an opaque marking on the substrate having a size corresponding to a grouping of less than ten of the photodetector elements.

7. The system of claim 1, wherein receipt of the object light by the reference pixel set is optically influenced by the reference element.

8. The system of claim 1, wherein:
the spatial filter comprises a plurality of filter pairs, each having a respective mask element of a plurality of mask elements paired with a respective reference element of a plurality of reference elements; and
the plurality of photodetector elements comprises a plurality of signal pixel sets of the photodetector elements, each spatially corresponding to a respective mask element of one of the plurality of filter pairs, and a plurality of reference pixel sets of the photodetector elements, each spatially corresponding to a respective reference element of one of the plurality of filter pairs.

9. The system of claim 8, wherein the plurality of filter pairs is arranged as an array of filter pairs spatially distributed over a substrate.

10. The system of claim 9, wherein the array of filter pairs is spatially distributed in a uniform density over the substrate.

11. The system of claim 8, wherein the plurality of filter pairs is arranged to form a three-dimensional pattern integrated with a substrate.

12. The system of claim 8, wherein:
the lens is configured to form the image of a scene in a field of view of the lens, the scene comprising a plurality of scene objects, each located a respective object distance away from the lens, such that scene light across the scene is focused by the lens onto the plurality of signal pixel sets and the plurality of reference pixel sets, receipt of the scene light over the plurality of signal pixel sets is optically influenced by the plurality of mask elements, and receipt of the scene light by the plurality of reference pixel sets is not optically influenced by the plurality of mask elements; and
the processor is configured to determine respective signal brightnesses for each of at least some of the respective signal pixel sets, to determine respective reference brightnesses for each of at least some of the respective reference pixel sets, and to compute the respective object distance of each of at least some of the plurality of scene objects as a function of the respective signal brightnesses and the respective reference brightnesses.

13. The system of claim 8, wherein:
the processor is configured to determine a signal brightness map comprising a respective signal brightnesses determined across at least some of the respective signal pixel sets, to determine a reference brightness map comprising respective reference brightnesses determined across at least some of the respective reference pixel sets, and to compute a depth map for the scene as a function of the signal brightness map and the reference brightness map.

14. The system of claim 1, further comprising:
a non-transient memory having a lookup table stored thereon, the lookup table comprising a plurality of calibration mappings,
wherein the processor is further configured to calibrate the system, for each of a plurality of iterations, each iteration associated with the scene object being a calibration target placed at a respective calibration distance of a plurality of calibration distances from the lens, by:
computing a ratio between the signal brightness and the reference brightness responsive to performing the determining the signal brightness and the determining the reference brightness; and
generating, in the lookup table, a respective one of the calibration mappings as associating the respective calibration distance for the iteration with the ratio computed for the iteration.

15. A method for calibrating a passive three-dimensional imaging system comprising a lens, an image sensor, and a spatial filter, the method comprising:
for each of a plurality of calibration distances away from the lens:

positioning a calibration target at the calibration distance;

receiving object light from the calibration target by the image sensor via the lens and the spatial filter, the spatial filter disposed in a filter plane and comprising a plurality of filter pairs, each being a respective mask element of a plurality of mask elements paired with a respective reference element of a plurality of reference elements, and the image sensor comprising a plurality of photodetector elements arranged in an array forming a detection plane substantially parallel to the filter plane, the plurality of photodetector elements comprising a plurality of signal pixel sets of the photodetector elements, each signal pixel set spatially corresponding to a respective mask element of one of the plurality of filter pairs, and a plurality of reference pixel sets of the photodetector elements, each reference pixel set spatially corresponding to a respective reference element of one of the plurality of filter pairs;

detecting a signal brightness for the object light according to an optical response to the object light as optically influenced by at least one of the plurality of mask elements of at least one of the plurality of filter pairs, the optical response being by the respective signal pixel sets corresponding to the at least one of the plurality of mask elements;

detecting a reference brightness for the object light according to an optical response to the object light by the respective reference pixel sets corresponding to the at least one of the plurality of filter pairs;

computing a ratio between the signal brightness and the reference brightness; and generating, in a memory, a lookup table having a plurality of calibration mappings, each calibration mapping associating a respective one of the plurality of calibration distances with the ratio computed with the calibration target positioned at the respective one of the plurality of calibration distances.

16. A method for passive three-dimensional imaging using a system comprising a lens, an image sensor, and a spatial filter, the method comprising:

receiving object light from a scene object located at an object distance away from the lens, the object light received by the image sensor via the lens and the spatial filter, the spatial filter disposed in a filter plane and comprising a plurality of filter pairs, each being a respective mask element of a plurality of mask elements paired with a respective reference element of a plurality of reference elements, and the image sensor comprising a plurality of photodetector elements arranged in an array forming a detection plane substantially parallel to the filter plane, the plurality of photodetector elements comprising a plurality of signal pixel sets of the photodetector elements, each signal pixel set spatially corresponding to a respective mask element of one of the plurality of filter pairs, and a plurality of reference pixel sets of the photodetector elements, each reference pixel set spatially corresponding to a respective reference element of one of the plurality of filter pairs;

detecting a signal brightness for the object light according to an optical response to the object light as optically influenced by at least one of the plurality of mask elements of at least one of the plurality of filter pairs, the optical response being by the respective signal pixel sets corresponding to the at least one of the plurality of mask elements;

detecting a reference brightness for the object light according to an optical response to the object light by the respective reference pixel sets corresponding to the at least one of the plurality of filter pairs; and computing the object distance of the scene object as a function of the signal brightness and the reference brightness by:

computing a ratio of the signal brightness and the reference brightness;

matching the ratio to a closest one of a plurality of pre-calibrated ratios in a lookup table comprising a plurality of calibration mappings, each calibration mapping indicating a respective one of a plurality of pre-calibrated object distances associated during a calibration routine with a respective one of the plurality of pre-calibrated ratios, each pre-calibrated ratio between a respective measured signal brightness and a respective measured reference brightness; and determining the object distance as the respective one of the plurality of pre-calibrated object distances associated with the closest one of the plurality of pre-calibrated ratios.

17. The method of claim 16, wherein the scene object is one of a plurality of scene objects of a scene in a field of view of the lens, each scene object located a respective object distance away from the lens, and further comprising:

determining a signal brightness map by performing the detecting the signal brightness across multiple of the plurality of signal pixel sets;

determining a reference brightness map by performing the detecting the reference brightness across multiple of the plurality of reference pixel sets; and computing a depth map for the scene as a function of performing the computing for the respective object distance of the each scene object in accordance with the signal brightness map and the reference brightness map.

18. The method of claim 16, wherein:

the spatial filter comprises a substrate;

each mask element comprises a light-inhibitive element integrated with the substrate; and each reference element comprises a light-permissive element integrated with the substrate adjacent to the respective mask element.

\* \* \* \* \*